United States Patent [19]

Yee et al.

[11] Patent Number: 4,919,943

[45] Date of Patent: Apr. 24, 1990

[54] PASTA FILATA-TYPE CHEESE PROCESS

[75] Inventors: Jeng-Jung Yee; Rajagopalan Narasimhan, both of Green Bay, Wis.

[73] Assignee: Schreiber Foods, Inc., Green Bay, Wis.

[21] Appl. No.: 109,821

[22] Filed: Oct. 16, 1987

[51] Int. Cl.$^5$ .................. A23C 9/14; A23C 19/02
[52] U.S. Cl. ........................ 426/39; 426/40; 426/42; 426/582; 426/585
[58] Field of Search ............... 426/39, 40, 582, 491, 426/585, 580, 657, 42

[56] References Cited

U.S. PATENT DOCUMENTS

| | | | |
|---|---|---|---|
| 4,075,360 | 2/1978 | Rule et al. | 426/585 |
| 4,460,609 | 7/1984 | Kristiansen et al. | 426/582 |
| 4,744,998 | 5/1988 | Van Gennip et al. | 426/582 |

OTHER PUBLICATIONS

Code of Federal Regulators, 1986. Title 21, Part 133.155 to 133.158, pp. 208–210.

Hansen, R. Mozzarella Cheese with Whey Proteins, North European Dairy J. Mar., 1987, pp. 21–23.

Maubors, J. L., Separation, Extraction and Fractionation of Milk Protein Components, Le Lait, Nov–Dec., 1984, pp. 485–495.

Kosikowski, F., 1977, Cheese and Fermented Milk Foods, Edwards Bio: Inc., Ann Arbor, MI., pp. 279–212.

Reinbold, G. W., Italian Cheese Varieties, Chas. Pfizen & Co., Inc. NY, 1963, pp. 16–24.

Friis, T. Introduction of Mozzarella Cheese Based on Ultrafiltration, North European Dairy J. 1981, Nov. pp. 220–223.

*Primary Examiner*—Marianne Cintins
*Attorney, Agent, or Firm*—Willian Brinks Olds Hofer Gilson & Lione

[57] ABSTRACT

A pasta filata-type cheese is made by combining casein having a desired level of calcium bound thereto, soluble proteins modified to render them less reactive with casein and other cheese ingredients to form a mixture and plasticizing the mixture to form the cheese.

33 Claims, 3 Drawing Sheets

PASTA FILATA-TYPE CHEESE PROCESS

FIELD OF THE INVENTION

This invention relates to pasta filata-type cheese and processes and systems for making such cheese. In particular, this invention relates to pasta filata- type cheese which incorporates soluble proteins, such as, whey proteins and to processes and systems for making such pasta filata-type cheeses.

BACKGROUND OF THE INVENTION

"Pasta filata" refers to a type of cheese having a plastic pliable homogeneous stringy structure. The pasta filata cheeses are traditionally made by producing curds and whey, draining the whey and immersing the curd in hot water or hot whey and working, stretching and molding while it is in a plastic condition. The principal varieties of pasta filata cheeses are: Caciocavallo, Provolone, Provolette, Pizza Cheese, Mozzarella, Provole, Scamorze, and Provatura. The well known example of pasta filata-type of cheese is mozzarella. In the U.S., the standards of identity of the code of federal regulations subdivides mozzarella cheeses into: "Mozzarella", "Low Moisture Mozzarella", "Part Skim Mozzarella" and "Low Moisture Part Skim Mozzarella." In this specification when the term pasta filata or mozzarella is used in a generic sense, it is not capitalized. When it is used in a sense defined by the standards of identity, the term is capitalized. As defined by the FDA regulations, Mozzarella has a moisture content of more than 52 but not more than 60 weight percent and the fat in dry matter (FDM) of not less than 45 percent by weight. The Low Moisture Mozzarella has a moisture content of more than 45 but not more than 52 weight percent and FDM of not less than 45 weight percent. The Part Skim Mozzarella contains more than 52 but not more than 60 percent of moisture by weight and has the FDM of less than 45 but not less than 30 percent. The Low Moisture Part Skim Mozzarella contains more than 45 but not more than 52 percent of moisture by weight and has the FDM of less than 45 but not less than 30 percent.

One important use for pasta filata-type cheeses is as a topping for baked pizza. The most common type of pasta filata cheese used as a topping on baked pizzas is mozzarella, and in particular, Low Moisture Part-Skim Mozzarella. In fact, Low Moisture Part Skim Mozzarella is sometimes referred to as "pizza cheese".

Pasta filata-type cheese used as a pizza topping must possess certain functional characteristics. Specifically, the cheese must melt into a homogeneous mass without burning or blistering when subjected to pizza baking conditions. The cheese must possess acceptable level of stringiness when hot. The cheese must release sufficient amount of free oil to prevent surface burning of cheese during pizza baking. Finally, pock markings must be uniform, i.e., when heated the cheese must produce openings throughout to allow the sauce to go therethrough evenly.

In recent years the dairy industry has tried to increase the yield of cheese making processes by recovering the whey proteins in cheese. Several attempts have been made to produce pasta filata-type cheese that incorporates whey proteins. One method for producing "Pasta Filata" type cheese, which employs a step of ultrafiltration of milk is disclosed in U.S. Pat. No. 4,460,609 (Kristiansen et al.). According to the process of the Kristiansen et al. patent, pasta filata-type cheese is made by ultrafiltration of milk to produce a concentrate containing increased proportions of fat and proteins. An acid is added to the concentrate to coagulate it and to form a "cogel". Liquid is then separated from the "cogel" to increase the "cogel's" dry solids content. The cogel is then subjected to kneading and stretching. Since upon coagulation, the cogel undergoes syneresis, some of the whey proteins are lost in the separated liquid. Accordingly, the Kristiansen et al. process recovers in the cheese only part of the whey proteins that were originally present in the milk.

Another process developed by Pasilac Inc. for making mozzarella that incorporates whey protein by ultrafiltration is described in North European Dairy Journal (November, 1981) pp. 220–223. In the Pasilac process, milk is first standardized and pasteurized. Then the milk is acidified either microbiologically or chemically. The acidified milk is ultrafiltered to produce a retentate having a solids content corresponding to that of the final cheese. The lactose content of the retentate is adjusted by diafiltration. The retentate is then cooled to the culturing temperature. Lactic culture and rennet are added to convert the retentate into a cheese block. When the pH of the cheese block has reached the required value, the traditional mozzarella plasticization is carried out. The cheese block is stretched in hot water. The warm cheese mass is then molded into its final shape, cooled, salted and packed.

The above-described Pasilac process was claimed to increase the yield by about 18 percent over the traditional mozzarella making processes due to the recovery of whey proteins. However, attempts to commercialize the Pasilac process in the United States have failed because the process could not produce a product that would meet the necessary functional characteristics of mozzarella cheese. Specifically, the Pasilac cheese did not possess the necessary melt and stretch characteristics.

Another process using ultrafiltration of milk in the manufacture of mozzarella incorporating whey proteins was attempted and failed commercially in Denmark. As reported in North European Dairy Journal (March 1987), pp. 21–23, the Vesthimmerland dairy installed a mechanized ultrafiltration plant for the production of mozzarella having capacity of 5 tons per 24 hours. The cheese produced by this process did not meet the necessary functional characteristic for use on pizza and the plant had to be converted back to produce traditional mozzarella without whey proteins.

Thus, the prior attempts have been unsuccessful in devising an efficient, economical process that can produce pasta filata-type cheese incorporating high levels of soluble proteins, such as, whey proteins and having acceptable functional characteristics for use as cheese topping on baked pizza. There is, therefore, an unsatisfied, long-felt need for such product and for a process and system for making such a product.

SUMMARY OF THE INVENTION

The process and system of the present invention produce pasta filata-type cheese incorporating high levels of soluble proteins, such as, whey proteins, and having functional characteristics (including melt, stretch, free oil release and pock marking) acceptable for use as a topping on baked pizza.

In accordance with the present invention, soluble proteins are modified to render them less reactive with casein. The casein is treated, if needed, to bind desired levels of calcium. The modified soluble proteins, casein having a desired level of bound calcium and other cheese ingredients are then mixed. The resulting mixture is plasticized to convert it into a homogeneous pasta filata-type cheese.

Other aspects of the present invention will become apparent to those skilled in the art upon studying this specification and the appended claims.

DETAILED DESCRIPTION OF THE INVENTION

The process of the present invention produces pasta filata-type cheese that incorporates high levels of soluble proteins, such as, whey proteins and has functional characteristics required for use as a topping on baked pizza.

Figure 1:
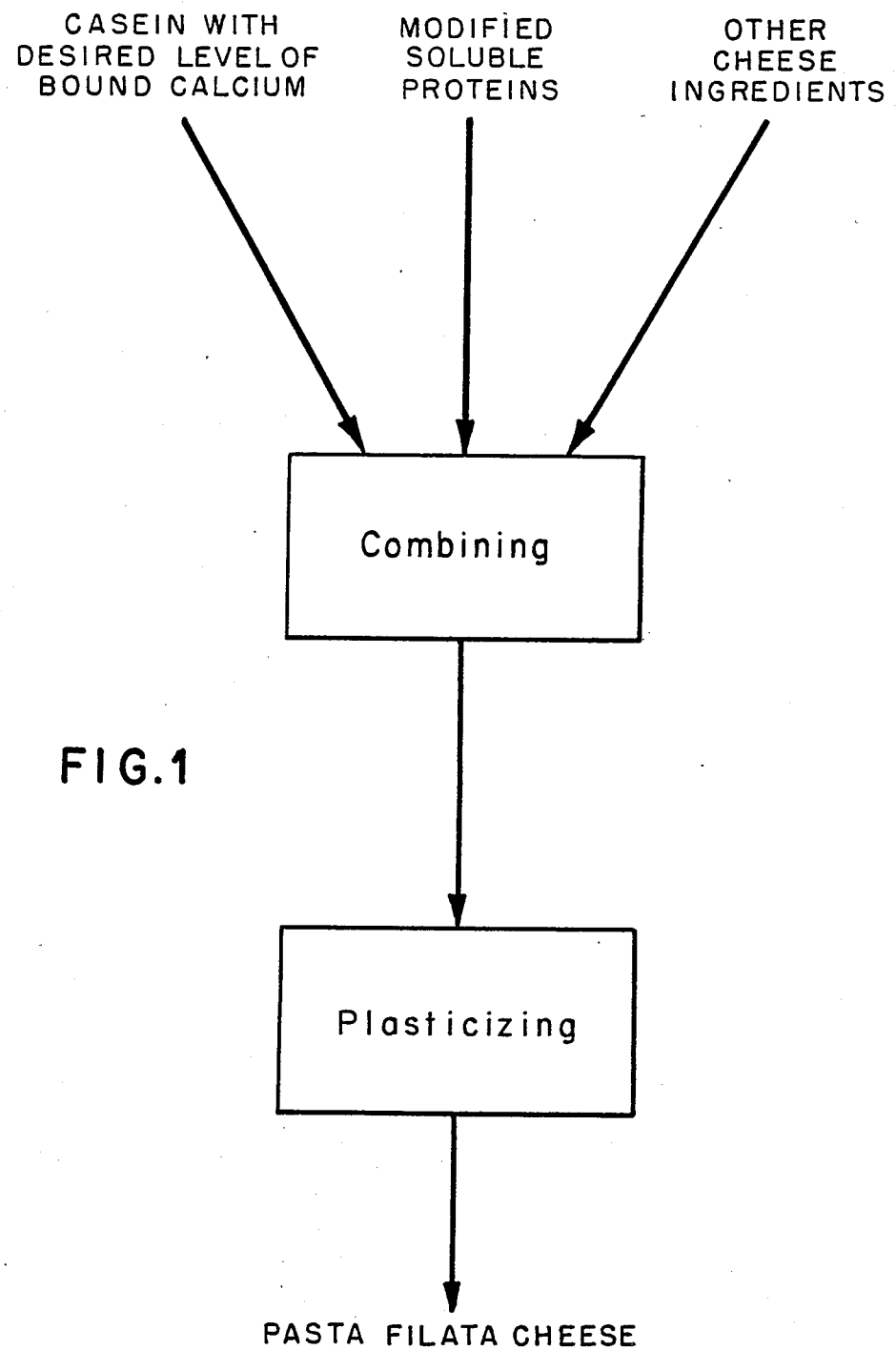
FIG. 1 depicts a flow diagram of a process embodying the present invention.

As shown in FIG. 1, one embodiment of the process of the present invention includes the following steps:
(1) producing a mixture of (a) soluble proteins which have been modified to render them less reactive with casein, (b) casein having a predetermined level of calcium bound thereto and (c) other cheese ingredients; and,
(2) plasticizing the mixture to convert it into a homogeneous pasta filata-type cheese.

For best results, the process also includes the step of contacting the casein with milk clotting enzymes to convert it to para casein (renneting). The renneting step is carried out prior to the plasticizing step. Most preferably, casein is renneted prior to forming of the mixture.

Generally, the casein and the soluble proteins can be obtained or produced from any suitable source. For example, they can be synthesized by dissolving them, respectively or together, in water.

The modification of the soluble proteins should be sufficient to render them less detrimental to casein functionality in pasta filata-type cheese. It should be sufficient to produce the required functionality characteristics in the cheese produced by this process. The modification of soluble proteins to render them less reactive with casein can be achieved by any suitable means, including by:
(1) heating the soluble protein to sufficiently high temperature and for a sufficiently long time period to denature them; or
(2) enzymatic proteolysis of soluble proteins followed by deactivation of the added enzyme; or
(3) reacting soluble proteins with sulfhydryl blocking agent to block the free sulfhydryl groups of soluble proteins.

The sufficiency of the modification by heat denaturation of the soluble protein can be tested by measuring its Nitrogen Solubility Index (NSI) at pH of 5.60. The Nitrogen Solubility Index is measuring the percent water soluble nitrogen. A 50 ml sample containing 5% modified protein is prepared. After the pH adjustment to 5.60, it is stirred for 1 hour at room temperature and then centrifuged. The Nitrogen Solubility Index is calculated as:

$$NSI = \frac{\text{Nitrogen content of the Supernatant}}{\text{Total nitrogen content of the sample}} \times 100$$

If the NSI values of the heat-denatured protein are less than 10, the modification is sufficient.

The sufficiency of the modification by enzymatic proteolysis and reacting with sulfhydryl blocking agents can be tested by subjecting the liquid containing 10% modified proteins to elevated temperature. If the liquid does not form a gel when it is gradually heated to a temperature of about 160° F., the modification is sufficient. Preferably, the liquid should not form a gel even when heated to a temperature of about 190° F.

The soluble proteins, such as whey proteins can be modified to render them less reactive with casein by heating it preferably to a temperature in the range from about 160° F. to about 300° F. for a time period in the range of about 1 second to about 2 hours, most preferably to a termperature in the range from about 180° F. to 190° F. for about one hour.

When the soluble proteins are modified by partial hydrolysis of the soluble proteins by trypsin, the modification is carried out perferably at the pH range of about 7.0 to 8.0 and the temperature range of about 120° F. to 130° F. for about 3 hours. The weight ratio of trypsin to soluble proteins is preferably about 1:50.

When the soluble proteins are modified by sulfhydryl blocking agents, iodoacetic acid and other known sulfhydryl blocking agents are used to react with the free sulfhydryl groups of the whey proteins. Preferably, iodoacetic acid is used and the reaction is carried out at pH of about 7.0 and the temperature of about 75° F. for about 24 hours. The weight ratio of iodoacetic acid to soluble proteins is preferably maintained at about 1:90.

The other cheese ingredients and their amounts depend on the desired final cheese composition. Generally, the other cheese ingredients may include, without limitation, fat of dairy or non-dairy origin, salt (NaCl), emulsifying salts, coloring agents, flavoring agents, acidifying agents and water.

The desired level of calcium bound to casein is between about 1000 mg and about 3000 mg, preferably about 1500 mg and about 2500 mg calcium per 100 g casein and it can be achieved by any suitable means. The convenient means of achieving the desired calcium level is by adjusting the pH of the liquid containing calcium and casein so that the pH is in a range from about 5.2 to about 5.9.

The mixture is plasticized by heating it to a temperature in the range of about 150° F. to about 300° F. and preferably about 150° F. to about 200° F. with mechanical manipulation. During the plasticizing step the modified soluble protein is gradually incorporated into the casein matrix structure with no adverse effect on cheese when compared with the traditional cheese. The functional characteristics of this cheese when it is used on baked pizza are substantially the same as those of the traditional pasta filata cheese.

The process of the present invention can be carried out on a feed stock containing casein and soluble proteins and optionally other cheese ingredients. Generally, the soluble proteins are in the form of whey proteins. However, other soluble proteins can also be used in connection with the present invention. The process of the present invention preferably includes the following steps: (1) separating the feedstock into a casein fraction and a whey protein fraction; (2) modifying the whey protein; (3) achieving the desired level of calcium bound to the casein; (4) combining the casein, the modified whey proteins, and other ingredients of cheese to produce a mixture; and (5) plasticizing the mixture to form a homogeneous pasta filata-type cheese. The modifying and the achieving steps must be performed prior to the plasticizing step. The achieving step is carried out preferably by adjusting the pH of the feed stock.

Many acids may be used for the adjusting pH of the feed stock, of the separated casein fraction, or of the combined mixture of casein, modified whey protein and other ingredients. Acetic acid, hydrochloric acid, lactic acid and citric acid can be used. The preferred acid used for adjusting the pH is acetic acid or vinegar. The amount of acid needed to adjust pH is determined by the calcium balance of the casein. The amount of the acid needed to achieve the desired pH depends on the selected acids and step of this process in which acid is added.

For best results, the process also includes the step of renneting casein to convert it to para casein. The treatment of the casein with milk clotting enzymes to convert casein to para casein can be effected any time prior to the plasticizing step. When the combined mixture is formed from a feed stock, the treatment can be effected before the separation of the feed stock into the two fractions or can be effected after the mixture is formed but prior to plasticizing it.

DESCRIPTION OF THE PREFERRED EMBODIMENTS

First Embodiment

Figure 2:
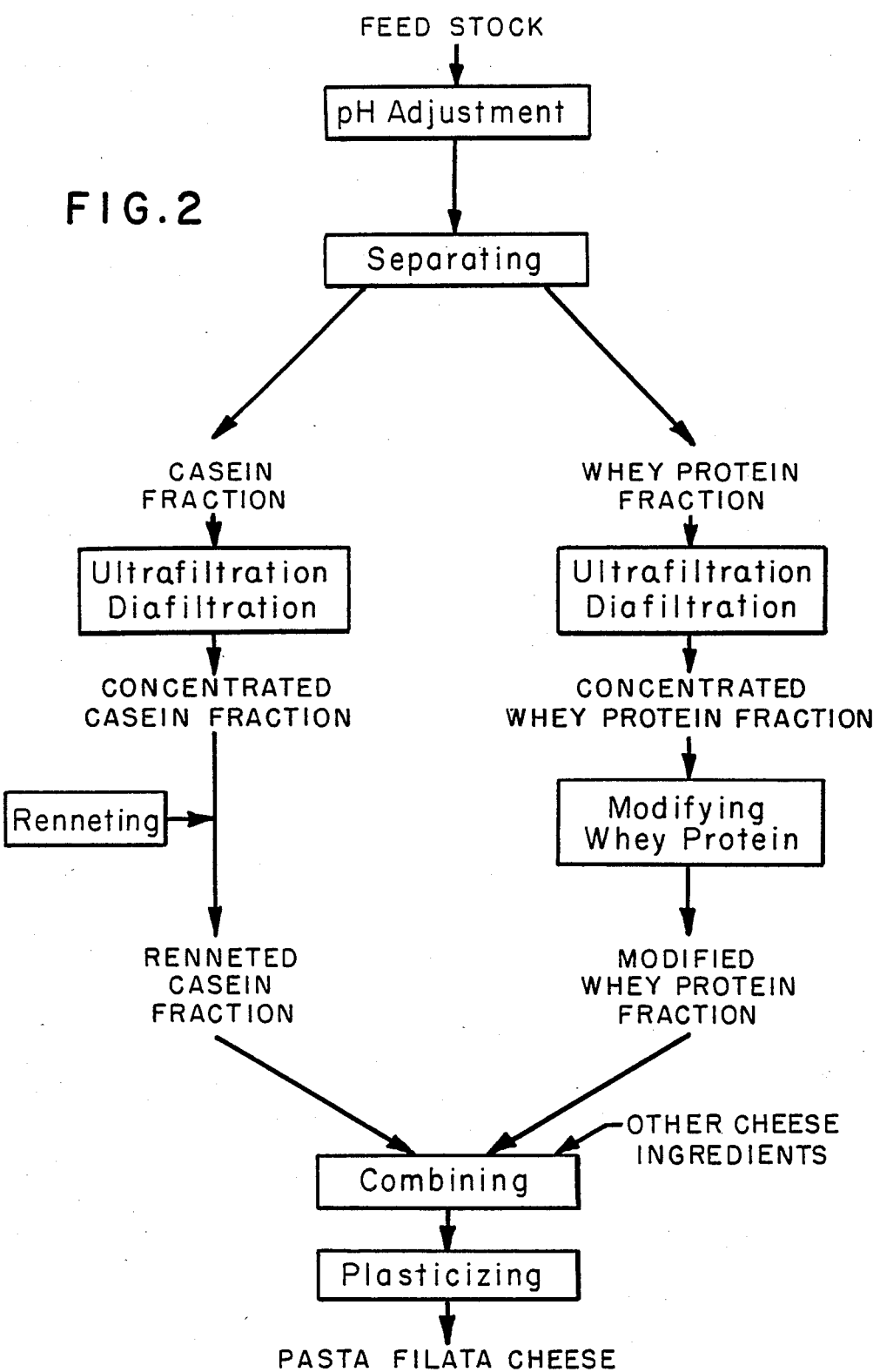
FIG. 2 depicts a flow diagram of a preferred embodiment of the process of the present invention.

The present invention will now be described in connection with the first preferred embodiment depicted in FIG. 2. As shown in FIG. 2, the starting material is a feed stock containing soluble whey proteins and casein. The feed stock can be prepared in any desirable manner. For example, it is comprised of a naturally occurring substance, such as, milk. In fact, the preferred feed stock is milk and most preferred is cows' milk. In the alternative, it can be synthesized by combining the necessary ingredients. For example, a feed stock can be prepared by reconstituting ingredients, such as nonfat dry milk, sodium or calcium caseinate, fat of dairy or non-dairy origin, whey proteins, carbohydrates, minerals and vitamins. Similarly, it can be made from milk whose composition has been adjusted by addition of or removal of fat, addition of nonfat milk solids or concentration by processes such as ultrafiltration or vacuum evaporation.

If a specific ratio of fat to protein is desired in the final product, such ratio can be established during the feed stock preparation. For example, a Part-Skim, Low-Moisture Mozzarella (having about 33.28% fat in dry matter) produced according to this invention requires a fat to protein ratio in the milk equivalent to about 0.59. The adjustment of fat to protein ratio can be achieved by removing cream from the whole milk. Fat of dairy origin can be added in the form of concentrated cream, butter, plastic cream, anhydrous milkfat. Fat of non-dairy origin should have desired solid fat index when used for preparation of substituted cheese.

The pH of the feed stock containing casein and soluble whey proteins is adjusted to be in the range from about 5.2 to about 5.9 to achieve the desired level of calcium bound to the casein, i.e., between about 1000 mg to about 3000 mg, preferably about 1500 to about 2500 mg calcium per 100 g casein. The pH is preferably adjusted using acetic acid or vinegar. Instead of controlling the level of calcium bound to the casein by the pH adjustment of the feed stock, the same effect can be achieved by pH adjustment of the casein before it is combined to produce the mixture. However, pH adjustment of the feed stock is preferred.

Then, the feed stock is separated into a casein fraction and a whey protein fraction. The separation of the feed stock can be effected by any suitable means. A convenient means for separation is by passing the feed stock through ceramic or mineral microfiltration membrane. Any microporous membrane having pores sufficiently large to permit passing of the whey protein but sufficiently small to retain casein is suitable for use with this embodiment. Another convenient method of separating the feed stock into the casein fraction and the whey protein fraction is by ultracentrifugation, as described by J. L. Maubois, in Separation, Extraction and Fractionation of Milk Protein Components, published in Le Lait (Nov.–Dec., 1984) pp. 485–495. If the casein stock is renneted prior to the separation of the feed stock into a casein fraction and a whey protein fraction (not shown in FIG. 2) conventional curd/whey separating means such as heating, draining and centrifuging can be used for achieving the separation.

As shown in FIG. 2, the separated casein fraction and whey protein fraction is each selectively concentrated through ultrafiltration and diafiltration. If needed, these fractions can be further concentrated by evaporation (not shown). The amount of whey proteins in the concentrated whey protein fraction is generally in the range from about 10 to about 35 percent by weight. The amount of casein in the concentrated casein fraction is generally in the range from about 20 to about 45 percent by weight.

As shown in FIG. 2, the conversion of casein to para casein is preferably carried out on the concentrated casein fraction to produce renneted casein fraction. The milk clotting enzyme can be animal, microbial, plant or mixture thereof. The enzyme preferred for best performance is calf rennet.

The concentrated whey protein fraction is modified to render it less reactive with casein by tryptic proteolysis followed by deactivation of the added trypsin. The modification is carried out preferably at the pH range of about 7.0 to 8.0 and the temperature range of about 120° F. to 130° F. for about 3 hours. The weight ratio of trypsin to soluble proteins is preferably about 1:50. The concentrated whey protein fraction ca also be rendered less reactive with casein by other suitable means including those mentioned above, such as heat-denaturation and reacting with sulfhydryl blocking agents.

Referring to FIG. 2, the renneted casein fraction, the modified whey protein fraction and other cheese ingredients are combined to form a mixture. The other cheese ingredients may include fat of dairy or non-dairy origin, salt (NaCl), emulsifying salts, coloring agents, flavoring agents, acidifying agents and water. The identity and the amount of the other cheese ingredients added in this step depend on the type of cheese being made and its desired characteristics. Additionally, some or even all of the additional ingredients can be included in the feed stock and maintained in the combined fractions. It is preferred, however, to add most of the cheese ingredients other than casein and whey proteins at the combining step.

As shown in FIG. 2, it is prefered to add rennet to the concentrated casein fraction. It can also be added to the feed stock prior to separation or to the combined mixture prior to plasticization.

As depicted in FIG. 2, the mixture is plasticized by heating to a temperature in the range of 150° F. to 300° F. with mechanical manipulation. During the plasticizing step, the modified whey protein is gradually incorporated into the casein matrix structure with no adverse effect on cheese and the functional characteristics when it is used on baked pizza.

Although the process of the present invention does not require the use of salt, salt may, nevertheless, be added during the process to achieve the desirable salt level in the finished cheese. Preferably, the salt is added in dry form during combining stage of the present process with the casein, and the modified whey protein prior to the plasticizing step. The amount of the salt added is generally less than about 2% by weight of the finished cheese.

MOST PREFERRED EMBODIMENT

Figure 3:
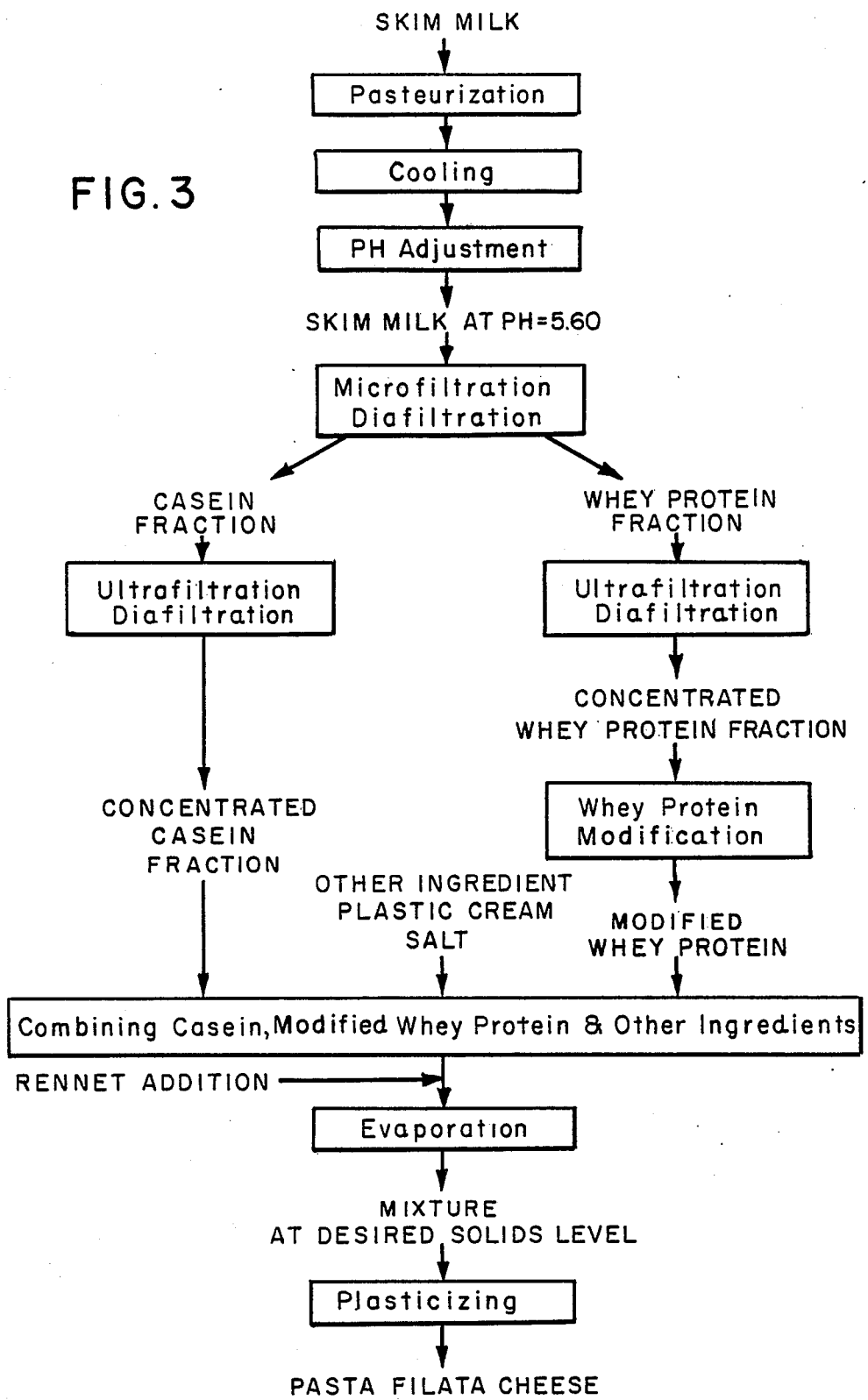
FIG. 3 depicts a flow diagram of the most preferred embodiment of the process of the present invention.

The present invention will be described in more detail in connection with the presently most preferred embodiments depicted in FIG. 3. Referring now to FIG. 3, a feed stock comprising cows' skim milk is subjected to conventional pasteurization. The pasteurized skim milk is then cooled to a temperature in the range from about 40° F. to about 80° F., most preferably to about 50° F.

As depicted in FIG. 3, the pH of the cooled skim milk is then adjusted by adding sufficient amount of vinegar to lower the pH to about 5.60.

The pH adjusted skim milk is then subjected to micro and diafiltration to separate it into two fractions. The microfiltration is effected by passing the milk through a microfiltration food grade membrane having pore size sufficiently large to allow whey proteins to pass therethrough but sufficiently small to prevent casein from passing therethrough.

The resulting casein fraction comprises casein as its major component with other minor components such as lactose, whey proteins, minerals and vitamins. The resulting whey protein fraction comprises whey proteins as the key protein component with other minor components such as lactose, casein, minerals and vitamins.

As shown in FIG. 3, the casein fraction is subjected to ultra and diafiltration to selectively concentrate it, producing a concentrated casein fraction. Similarly, the whey protein fraction is subjected to ultra and diafiltration to selectively concentrate it, producing a concentrated whey protein fraction.

The concentrated whey protein fraction is then rendered less reactive with casein by trypsin hydrolysis. The trypsin hydrolysis of the whey protein is carried out preferably at the pH of about 8.0 and the temperature of about 125° F. for 3 hours. The weight ratio of trypsin to soluble proteins is preferably about 1:50. The concentrated whey protein fraction can also be rendered less reactive with casein by other suitable methods, including those mentioned above (i.e., heat denaturation or reacting with sulfhydryl blocking agents). The resulting modified whey protein, concentrated casein and other ingredients in the form of plastic cream and salt are combined to form a mixture. A calf rennet is then added to the mixture to convert casein to para casein and additional moisture is removed from the mixture by evaporation to achieve the desired solids level.

The mixture having the desired solids level is then plasticized by heating to a temperature of about 150° F. to 200° F. while subjecting it to agitation. The heating and agitation are continued until a pasta filata cheese is produced.

EXAMPLES

The following examples are provided for illustrative purposes. They are not intended to limit the scope of the present invention. Examples 1 and 2 have been performed. Examples 3 and 4 are prophetic.

EXAMPLE

Skim milk (170 gallons, pH=6.58) was batch pasteurized at 145° F. for 30 minutes and cooled down to 63° F. A total of 3632 grams of 200 grain vinegar (Richter Vineger Corp.) was added to the skim milk to adjust the pH of the skim milk down to 5.60 before it was rewarmed up to 80° F. The adjustment of the pH of the skim milk increased the soluble calcium content from 60 mg calcium per 100 grams (at pH=6.58) to 93 mg calcium per 100 grams (at pH =5.60).

Sixty-three ml calf rennet (Chris Hansen's single strength) diluted with 1000 ml water was added into the skim milk at 80° F. and the milk was agitated through the coagulation period. About 12 minutes after addition of the rennet, very small curds were noticed. While the milk was being agitated, the rennet-treated skim milk was then pumped through a Pick heater (Pick Heater, Inc., Model SC-7) to heat it to 135° F. The heated milk was then continuously fed into a centrifuge (Equipment Engineering, Model No. N x 207) to separate into a casein fraction and a whey protein fraction.

The approximate compositions of the casein fraction and whey protein fraction were as follows:

| Fraction | Protein | Lactose | Solids | pH |
|---|---|---|---|---|
| Case in Fraction (curd) | 37.83 | 2.08 | 43.55 | 5.68 |
| Whey Protein Fraction (whey) | 0.78 | 4.62 | 6.16 | 5.61 |

The separated whey protein fraction was further selectively concentrated through ultrafiltration with extensive diafiltration to achieve a concentrate (UF retentate) with the following composition:

| | Protein | Lactose | Solids | pH |
|---|---|---|---|---|
| UF Retentate of the Separated Whey Protein Fraction | 9.34 | 0.85 | 11.76 | 5.60 |

Portions of the UF concentrated whey protein fraction were subjected to heat treatment, partial proteolysis and sulfhydryl blocking-type modifications.

A part of the UF concentrated whey protein fraction was modified by heat treatment at 190° F. for 1 hour. The modified whey proteins were then freeze dried.

Another part of the UF concentrated whey protein fraction was modified by partial proteolysis with trypsin. The whey protein solution was adjusted to pH 8.0 with 10 N NaOH and then reacted with trypsin (Novo, PTN 3.0S) for 3 hours at 120° F. The whey protein to trypsin ratio was 50:1. Following partial proteolysis the trypsin was deactivated by heating at 190° F. for 1 hour. The solution was then cooled to 100° F. and then adjusted to pH 5.60 with 6 N HCl and then freeze dried.

Yet another part of the UF concentrated whey protein fraction was subjected to sulfhydryl blocking using iodoacetic acid. The fraction was adjusted to pH 7.0 and treated with iodoacetic acid (iodoacetic acid to whey protein ratio of 1:90) at room temperature for 24 hours and then heat-treated at 190° F. for 1 hour, then cooled to 100° F. The pH was then adjusted to 5.60 with 6 N HCl and the modified whey protein fraction was freeze dried.

Each of the three modified whey protein fractions (freeze dried powders) were then combined separately with the casein fraction and other cheese ingredients such as plastic cream, salt and water. Three separate mixtures were produced. The mixtures differed from one another only by the way the whey proteins were modified. Each mixture was plasticized inside a 10# size Rietz cooker with indirect steam jacket heating with auger speed set at 220 rpm. Each mixture was then cooked up to 165° F. and each was successfully plasticized into a homogeneous mass with fibrous and stretchy characteristics. The compositions of the mixtures were as follows:

Mixtures Formulation Prior to Plasticization

| Mixtures Formulation Prior to Plasticization | |
|---|---|
| Separated Casein Fraction | 8 lbs. |
| Modified Whey Protein Freeze Dried Powder | 242.2 grams |
| Plastic Cream | 1209.6 grams |
| Salt | 103 grams |
| Water | 536.8 grams |

The compositions of the finished product were as follows:

| Finished Product Composition | |
|---|---|
| Moisture | 49.88% |
| Fat | 17.00% |
| Protein | 27.48% |
| Ash | 2.79% |
| FDM | 33.92% |

Whey protein content in the total protein of the above prepared finished mozzarella was about 15 percent. The three mozzarella preparations containing the three different modified whey proteins fell within the category of "Low-Moisture, Part-Skim Mozzarella" and had acceptable performance on baked pizza in terms of functional requirements such as melt, stretch, pock marking and free oil.

EXAMPLE 2

The casein fraction as obtained by the procedure of Example 1 was used as casein source. A commercial undenatured whey protein concentrate from Denmark, Lactoprodan-80, produced from whey by ultrafiltration and spray drying was used as whey protein source (whey protein fraction).

Modifications of the whey proteins were carried out on the 10% Lactoprodan-80 solution. Modification methods were same as the three methods listed in Example 1. The resulting modified Lactoprodan-80's were then freeze-dried.

The separated casein fraction and the modified Lactoprodan-8's (freeze-dried powders) were combined with other ingredients such as plastic cream, salt, and water. The three combined mixtures were also successfully plasticized at 165° F. inside a 10# size Rietz cooker with indirect steam jacket heating and auger speed set at 220 rpm.

The combined mixture formulations and the finished product compositions were as follows:

Combined Mixture Formulation Prior to Plasticization

| Combined Mixture Formulation Prior to Plasticization | |
|---|---|
| Separated Casein Fraction | 8 lbs. |
| Modified Lactoprodan-80 Freeze Dried Powder | 205 g |
| Plastic Cream | 1176.5 g |
| Salt | 100 g |
| Water | 453.4 g |

Finished Product Composition

| Finished Product Composition | |
|---|---|
| Moisture | 49.5% |
| Fat | 18.5% |
| Protein | 28.19% |
| FDM | 34.85% |

Modified Lactoprodan-80 content in the total protein of the above-prepared finished mozzarella formulations was about 15 percent. The three mozzarella formulations also fell within the category of "Low Moisture, Part-Skim Mozzarella" and had acceptable performance on baked pizza in terms of functional requirements such as melt, stretch, pock marking and free oil characteristics.

EXAMPLE 3

The following example has not been performed but is provided to further illustrate the invention. It is not intended to limit the scope of the invention in any manner.

The pasteurized skim milk at pH=5.60 as obtained by the procedure illustrated in the Example 1 is separated into a casein fraction and a whey protein fraction by microfiltering and diafiltering the milk at about 80° F. The microporous membrane having pore size sufficiently large to permit passing of the whey protein but sufficiently small to retain casein is suitable for effecting this separation. The purpose of diafiltration along with microfiltration is to wash out whey protein from the casein fraction as much as possible.

The separated casein and whey protein fraction are then subjected to ultrafiltration and diafiltration in order to selectively concentrated the separated casein and whey protein. The whey protein content in the concentrated whey protein fraction is about 30% by weight. The casein content in the concentrated casein fraction is about 20% by weight.

Whey protein modifications are carried out on the concentrated whey protein fraction to render it less reactive with casein. The modification methods are same as the ones described in Example 1.

Conversion of casein to para casein with calf rennet is also carried out on the concentrated casein fraction.

The combined mixture of the renneted casein, modified whey proteins, and other cheese ingredients, such as plastic cream and salt, is formulated to have a desired final FDM (Fat in Dry Matter) ranging between 30 and 45%. The combined mixture is then fed into a thin film evaporator to achieve a combined mixture with a desired moisture level between 45 and 52% by weight The discharged mixture from the evaporator at about 90° F. is then cooked up to 165° F. and successfully plasticized into a homogenous mass with stretchy characteristics. Prepared mozzarella falls within the category of Low-Moisture, Part-Skim Mozzarella and has whey protein content in the total protein of the finished cheese at about 15 to 20% by weight.

The prepared mozzarella also has acceptable performance on baked pizza in terms of functional requirements, such as melt, stretch, pockmarking and free oil characteristics.

EXAMPLE 4

The following example has not been performed but is also provided to further illustrate the invention.

The skim milk at pH=5.60 as obtained by the procedure of Example 1, is first ultrafiltered and diafiltered at 80° F. to achieve a skim milk retentate containing about 12% total protein by weight. The skim milk retentate is then subjected to ultracentrifugation to separate into a casein fraction and a whey protein fraction. The ultracentrifuged casein fraction has protein content of about 30%, whereas the ultracentrifuged whey protein fraction has the protein content of about 3% by weight.

The ultracentrifuged whey protein fraction is concentrated through ultrafiltration and diafiltration to further selectively concentrate the whey proteins. The concentrated whey protein fraction has whey protein content at about 30% by weight.

Modifications of the whey proteins are carried out on the concentrated whey protein fraction to render them less reactive with casein. The methods for modification are same as the ones listed in Example 1. Conversion of casein to para casein with calf rennet is carried out on the ultracentrifuged casein fraction.

The combined mixture of the recent reacted casein, modified whey protein, and other cheese ingredients, such as plastic cream and salt, is formulated to have a desired final FDM (Fat in Dry Matter) ranging between 30 and 45% by weight and have whey protein content in a total protein at about 15 to 20% by weight.

The combined mixture is then fed into a thin film evaporator to achieve a combined mixture at about 90° F. with a desired moisture level between 45 to 52% by weight.

The discharged mixture from the evaporator at about 90° F. is then cooked up to 165° F. in the Rietz cooker and successfully plasticized into a homogenous mass with stretchy characteristics.

The prepared mozzarella falls within the category of Low-Moisture, Part-Skim Mozzarella and has acceptable performance on baked pizza in terms of functional requirements, including melt, stretch, pock marking and free oil characteristics.

Many changes and modifications of the embodiments of the present invention will occur to those skilled in the art upon studying this disclosure. All such changes and modifications that fall within the spirit of the present invention are intended to fall within its scope as defined by the claims.

We claim:

1. A process for making a pasta filata-type cheese with casein having bound calcium in the range from about 1000 mg to about 3000 mg per 100 g of casein and soluble proteins said process comprising the following steps:
   (a) modifying soluble proteins to reduce reactivity of said proteins toward casein so as to produce modified soluble proteins, reactivity of said soluble proteins toward casein being reduced sufficiently to produce cheese having stringy structure and stretchy characteristics of pasta filata type cheese;
   (b) combining said casein said modified soluble proteins and cheese ingredients which comprise fat to form a mixture;
   (c) plasticizing the mixture to form said pasta filata-type cheese.

2. The process of claim 1 wherein said soluble proteins comprise whey proteins.

3. The process of claim 1 further comprising the step of converting casein to para casein by milk clotting enzyme action prior to the plasticizing step.

4. A process for making a pasta filata-type cheese from casein, soluble proteins and cheese ingredients, said process comprising the following steps:
   (a) adjusting the calcium content of said casein to produce casein having bound calcium in the range from about 1000 mg to about 3000 mg per 100 g of casein;
   (b) modifying said soluble proteins to reduce reactivity of said proteins toward casein so as to produce modified soluble proteins, the reactivity of said soluble proteins toward casein being reduced sufficiently so that the produced cheese has stringy structure and stretchy characteristics of pasta filata-type cheese;
   (c) combining said casein of step (a), said modified soluble proteins, and cheese ingredients which comprise fat to produce a mixture; and,
   (d) plasticizing said mixture to produce said pasta filata-type cheese.

5. The process of claim 4 wherein said soluble proteins comprise whey proteins.

6. The process in claim 4 wherein the casein is converted to para casein by action of milk clotting enzymes prior to the plasticizing step.

7. The process of claim 6 wherein said milk clotting enzyme is a rennet of plant, animal or microbial origin or mixtures thereof.

8. The process of claim 4 wherein the step of modifying said soluble proteins comprises subjecting said soluble proteins to sufficiently elevated temperatures to denature said proteins.

9. The process of claim 4 wherein the step of modifying said soluble proteins comprises contacting said proteins with protease and heating the resulting mixture to inactivate the protease activity.

10. The process of claim 4 wherein the step of modifying said soluble proteins comprises contacting said soluble proteins with sulfhydryl blocking agents.

11. A process for making a pasta filata-type cheese from a feed stock comprising casein, whey proteins and cheese ingredients which comprise fat, said process comprising the following steps:
    (a) separating said feedstock into a casein fraction and a whey protein fraction;
    (b) modifying the whey protein fraction to reduce reactivity of said whey proteins toward casein so as to produce modified whey proteins, said reactivity toward casein being sufficiently reduced so as to produce cheese with stringy structure and stretchy characteristics of pasta filata-type cheese;
    (c) adjusting the calcium content of the casein fraction, so as to produce casein having a range from about 1000 mg to about 3000 mg per 100 g of casein;
(d) combining the casein, the modified whey proteins and cheese ingredients comprising fat to produce a mixture and,
(e) plasticizing the mixture to form a homogeneous plastic mass.

12. The process of claim 11 wherein the pH of said feed stock is adjusted before separating said feed stock into a casein fraction and a whey protein fraction.

13. The process of claim 11 wherein said feed stock is treated with milk clotting enzymes to convert casein into para casein before separating said feed stock into a casein fraction and a whey protein fraction.

14. The process of claim 11 wherein the pH of said feed stock is adjusted and the feed stock is treated with milk clotting enzymes before the feed stock is separated into casein and whey protein fractions.

15. The process of claim 11 wherein said whey protein fraction is modified by heat treatment.

16. The process of claim 11 wherein said whey protein fraction is modified by protease-treatment and then heat-treated to inactivate the protease activity.

17. The process of claim 11 wherein said whey protein fraction is modified by treatment with sulfhydryl blocking agents.

18. The process of claim 11 wherein whey protein fraction is further concentrated prior to the modification step (b).

19. The process in claim 11 further comprising the step of concentrating the whey protein fraction after the step of modifying.

20. The process of claim 11 wherein said casein fraction is further concentrated prior to combining with the modified whey protein.

21. The process of claim 11 wherein the pH of the casein fraction is adjusted.

22. The process of claim 11 wherein the casein fraction is treated with a milk clotting enzyme to convert casein into para casein.

23. The process of claim 11 wherein the casein fraction is pH adjusted and treated with a milk clotting enzyme to convert casein into para casein.

24. The process of claim 11 wherein the combined casein, modified whey protein and cheese ingredient mixture is treated with a milk clotting enzyme to convert casein into para casein prior to plasticizing step.

25. The process of claim 11 wherein combined mixture of casein, modified whey protein and cheese ingredients is pH-adjusted prior to plasticizing step.

26. The process of claim 11 wherein the combined mixture of casein, modified whey protein and cheese ingredients is pH-adjusted and treated with a milk clotting enzyme to convert casein into para casein prior to plasticizing step.

27. The process of claim 11 wherein said fat in the combined mixture comprises fat of dairy or non-dairy origin.

28. The process of claim 11 wherein said cheese ingredients in the combined mixture further comprises sodium chloride.

29. The process of claim 11 wherein said cheese ingredients further comprise coloring agents.

30. The process of claim 11 wherein said cheese ingredients further comprise flavoring agents.

31. The process of claim 11 wherein said cheese ingredients further comprise acidifying agents.

32. The process of claim 11 wherein said cheese ingredients further comprise emulsifying salt.

33. The process of claim 11 wherein the plasticizing step comprises heating the combined mixture of casein, the modified whey protein and other cheese ingredients to a temperature in the range of 150° F. to 300° F.

* * * * *

UNITED STATES PATENT AND TRADEMARK OFFICE
CERTIFICATE OF CORRECTION

PATENT NO. : 4,919,943
DATED : April 24, 1990
INVENTOR(S) : Jeng-Jung Yee et al.

Page 1 of 2

It is certified that error appears in the above-identified patent and that said Letters Patent is hereby corrected as shown below:

In column 4, line 24, please delete "perferably" and substitute therefor --preferably--.

In column 6, line 48, please delete "ca" and substitute therefor --can--.

In column 8, line 11, after "EXAMPLE" please insert --1--.

In column 8, line 37, please delete "Case in" and substitute therefor --Casein--.

In column 8, line 63, please delete "10 N" and substitute therefor --10 $\underline{N}$--.

In column 8, line 68, please delete "6 N" and substitute therefor --6 $\underline{N}$--.

UNITED STATES PATENT AND TRADEMARK OFFICE
CERTIFICATE OF CORRECTION

PATENT NO. : 4,919,943
DATED : April 24, 1990
INVENTOR(S) : Jeng-Jung Yee et al.

Page 2 of 2

It is certified that error appears in the above-identified patent and that said Letters Patent is hereby corrected as shown below:

In column 9, line 8, please delete "6 N" and substitute therefor --6 $\underline{N}$--.

In column 10, line 53, please delete "concentrated" and substitute therefor --concentrate--.

Signed and Sealed this

Fourth Day of August, 1992

Attest:

DOUGLAS B. COMER

*Attesting Officer*   *Acting Commissioner of Patents and Trademarks*